July 29, 1969  F. J. HAGEMANN  3,457,752

ROLLER-EQUIPPED STRAIGHTENING MACHINE

Filed Dec. 22, 1966  3 Sheets-Sheet 1

July 29, 1969   F. J. HAGEMANN   3,457,752
ROLLER-EQUIPPED STRAIGHTENING MACHINE
Filed Dec. 22, 1966   3 Sheets-Sheet 2

July 29, 1969  F. J. HAGEMANN  3,457,752
ROLLER-EQUIPPED STRAIGHTENING MACHINE
Filed Dec. 22, 1966  3 Sheets-Sheet 3
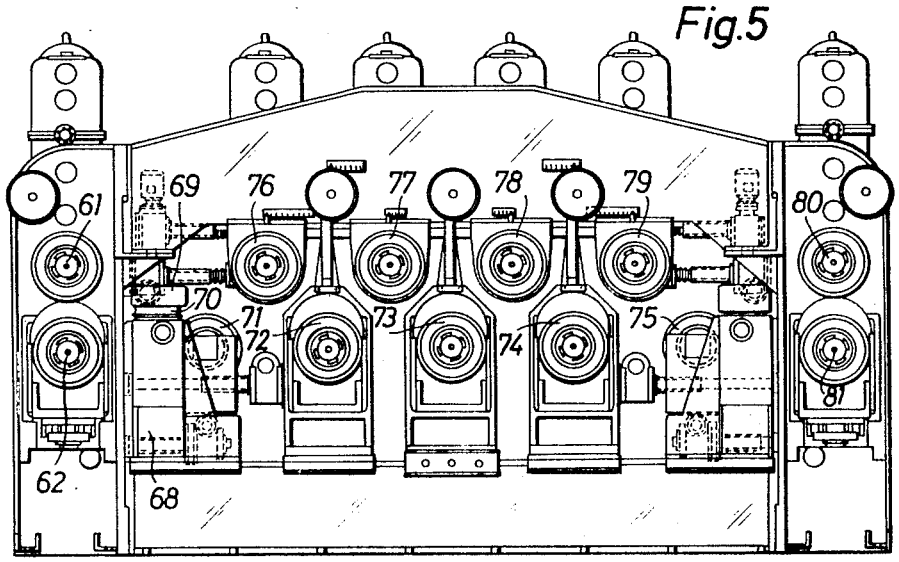
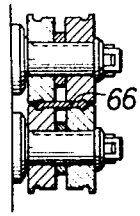
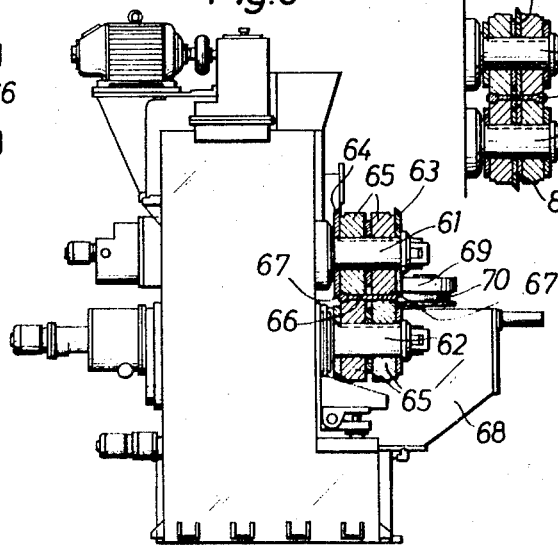
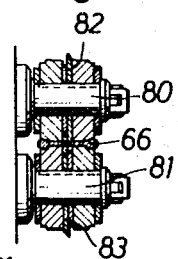

United States Patent Office 3,457,752
Patented July 29, 1969

3,457,752
ROLLER-EQUIPPED STRAIGHTENING MACHINE
Franz Josef Hagemann, Erkelenz, Rhineland, Germany, assignor to Maschinen- und Bohrgerate-Fabrik Alfred Wirth & Co. K.G., Erkelenz, Rhineland, Germany, a German company
Filed Dec. 22, 1966, Ser. No. 604,002
Claims priority, application Germany, Dec. 29, 1965, M 67,836; June 15, 1966, M 69,851
Int. Cl. B21f 11/00; B21d 1/02, 3/02
U.S. Cl. 72—129                                    13 Claims

ABSTRACT OF THE DISCLOSURE

A unitary machine for straightening material including straightening axle journals arranged in staggered relationship with respect to each other in an overhung position with each axle journal having a free end. An exchangable straightening roller is accommodated on the free end of each journal and the machine is equipped with at least one circular shearing tool means mounted on one of said journals.

Background of the invention

The invention relates to a roller-equipped straightening machine provided with straightening axle journals arranged in staggered relationship to each other, each of which receives a straightening roller capable of exchange.

In adjusting rolling mill products, for instance, it has heretofore been necessary to provide, in addition to one or several straightening machines, a cutting or shearing tool as a separate piece of equipment in order, for instance, to trim the edges of the material being straightened or to cut the material into portions. The shearing tool may possibly have to be produced from the work line, and may remain unused for a long period. For the most part, such shearing tools are expensive units, and this of course is objectionable from an economic viewpoint.

The object of the invention is to overcome the objectionable features existing in the art and to provide a particularly advantageous solution for the assembly of a shearing tool when adjustment has to take place.

The object of the invention is to provide a machine which fulfills all of the necessary requirements which can be produced at a minimum of expense and which will require a minimum of space and permit the trimming, cutting off and other work possible with a shearing tool to be effected together with the straightening process on one and the same machine.

To accomplish the above and other important objects the present invention is directed to a unitary machine for straightening material which includes straightening axle journals disposed in staggered relationship with respect to each other in an overhung position with each of the axles having a free end which accommodates an exchangable straightening roller and with at least one circular shearing tool means being mounted on one of said journals.

By the shearing tool of the present invention, a combined straightening and shearing machine is produced from the previous one-purpose machine, which makes separate devices unnecessary. An important advance over the known prior art therefore consists, inter alia, in that the circular knife shearing units, otherwise necessary, and in addition, which are expensive and not economically usable in small production firms, can now be replaced by a simple apparatus requiring little outlay, in conjunction with the straightening machines.

Brief description of the drawings

The invention will now be described with reference to the accompanying drawings, which show embodiments of the invention but in no restrictive sense.

FIGURE 5 is a side elevational view of another embodiment of a roller straightening machine of the invention;

FIGURE 6 is an end view of the machine of FIGURE 5 viewed from the run-in side, together with a section through the knife arrangement located on this side;

FIGURE 7 is a view in section through another adjacent straightening roller; and FIGURE 8 is a view in section through the knife arrangement on the run-out side.

Detailed description of invention

Figure 1:
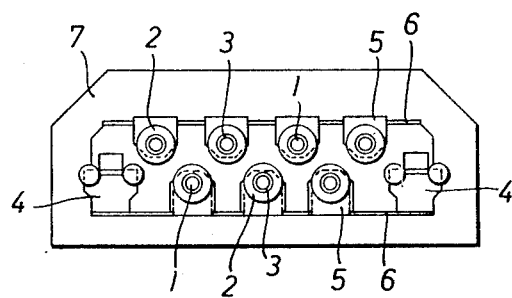
FIGURE 1 is an elevational view of a roller straightening machine of customary construction.

In FIGURE 1 a roller straightening machine for straightening bar and section steel is illustrated, in which straightening axles are arranged in staggered relationship, and seven main straightening rollers are present. The main straightening axles are carried in housings 5 and end in overhung straightening axle journals 1, on which rest straightening rollers 2, braced by means of a bayonet closure 3, and the rollers are, for instance, section steel rollers for straightening wide-flanged beams. A suitable connection is provided between the rollers 2 and driven straightening axle journals for rotary entrainment of the rollers. The housings 5 with the straightening axles are slidable inside a machine support 7 on slide ways 6, so that the roller distribution can be altered within certain limits. The smallest spacing between the rollers amounts to for instance 1300 mm. The lower housings can be equipped with means for the vertical adjustment of the straightening axles. Run-in and run-out blocks 4 are used for the supply and removal of the material to be straightened.

Figure 2:
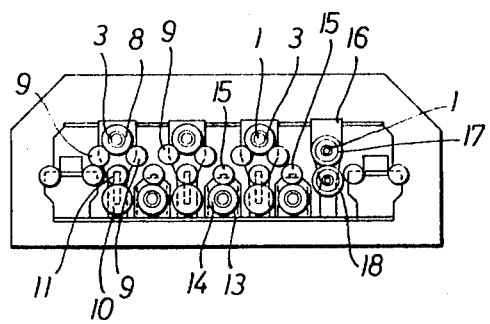
FIGURE 2 is an elevational view of a roller straightening machine equipped with a shearing tool.

The straightening machine illustrated in FIGURE 2 is, at the same time, equipped with a shearing tool in accordance with the invention. By this, it is possible to separate the material directly following the straightening procedure, and to trim the material, et cetera. After the material to be straightened has passed through straightening rollers 9, 11, 15, it reaches circular knives 17, 18, which are arranged in a frame-type knife carrier 16. The knife carrier 16 can be pushed as a whole on a motor driven journal 1, and the pairs of circular knives 17, 18 rest on sleeves.

Figure 3:
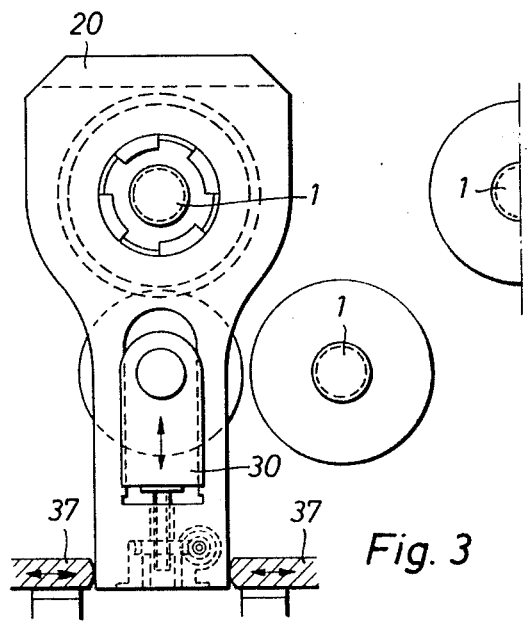
FIGURE 3 is a side elevational view of a removable shearing tool on a roller straightening machine.
Figure 4:
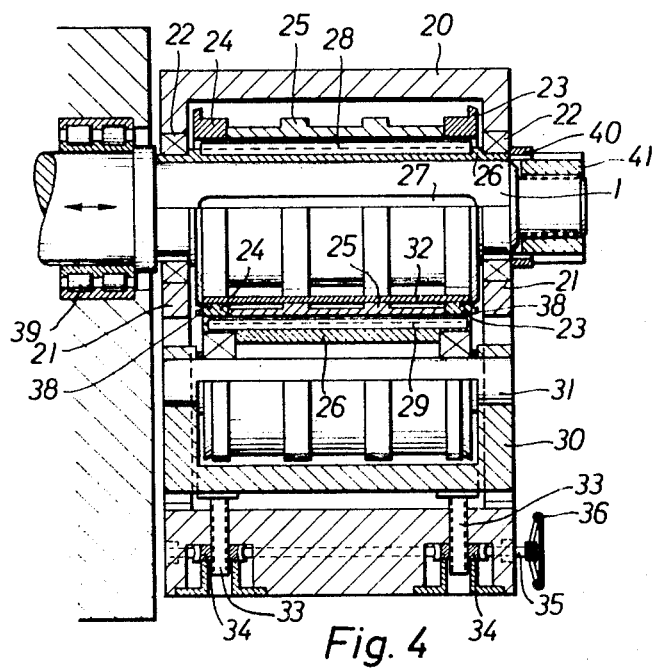
FIGURE 4 is a perpendicular sectional view through the device of FIGURE 3.

Details of an embodiment of the shearing tool are illustrated in FIGURES 3 and 4 and the tool can, for instance, be used for separating and trimming flat billets on both sides over their entire length.

The shearing device is arranged in a frame 20, which can be pushed from the side onto a journal 1. Inside cheeks or plates 21 of the frame are arranged roller bearings 22 for receiving the shearing pressure. Upon shearing knives 23, 24, and one or several rollers 25 are exchangeably pushed onto one or several sleeves 26 surrounding the journal 1. On rotary movement, the driven straightening axle entrains, by means of keys 27, 28, the shearing knives 23, 24 and the rollers 25.

In the lower part of the frame 20, a housing 30 is mounted for vertical movement, and carries an axle 31 for supporting the shearing knives 23, 24 and one or several rollers 25. The last-mentioned parts are here again arranged in an exchangeable manner on a sleeve 26. A key 29 prevents a relative movement between such components under load on the shearing operation. Of course, the lower pair of circular knives can also be constructed to be driven.

In the example illustrated, the shearing knives 23, 24 are used for the trimming of material 32 such as universal mill plates, shapes, bars, or broad flat bar steel to be straightened. A closer or farther spacing apart of the shearing knives 23, 24 is effected by a vertical displacement of the housing 30 by means of two spindles 33, worm wheels 34 and a worm shaft 35. The shaft 35 can be rotated by a hand wheel 36, a motor or mechanical/hydraulic devices.

The frame-type construction of the shearing tool affords, together with other advantages, relief to an overhung main straightening axle bearing 39, because the shearing forces occurring arise reciprocally via the cheeks 21 and only the straightening axle journal piece located between the bearings 22 is subjected to bending stress.

As can be seen from FIGURE 3, a guide for the frame 20 can be constituted by adjustable guide strips 37, which also permit angular displacement of the shearing knives facing each other with the straightening axle journal as a pivot point. This is of particular importance for the removal of trim strips 38 (FIG. 4) to a chopper or scrap spool arranged behind the straightening machine.

The mounting of the shearing tool is effected by pushing the tool on the straightening axle journal 1 and then securing the tool by a bayonet closure ring 40 provided with a nut 41.

More specifically, the periphery of the nut 41 is provided with a plurality of spaced apart longitudinally extending grooves and the ring 40 with a plurality of corresponding projections cooperable therewith. When the nut is drawn up to a determined amount on the journal 1, the ring 40 can be pushed over the nut until it abuts against a portion of the frame 20 which has previously been pushed on to the straightening axle. The ring 40 can then be rotated approximately 45° thus effecting a displacement of the projections relative to the grooves of the nut thereby locking the components.

On dismantling, the nut 41 is backed off several turns, the ring rotated, for instance, through approximately 45° and removed over the nut. The entire frame 20 together with the blades carried therein can then be removed over the nut 41.

The carriers for the additional rollers to be arranged selectively can be constructed similarly to the above described frame 20.

It should be mentioned that, for instance, for accurate arrangement in the work line it is possible to adjust the shearing knife frame in the axial direction at all times in common with the associated axle, or also optionally thereon.

The machine illustrated in FIGURE 2 shows, in comparison with the machine of FIGURE 1, a number of additional work rollers 9, 11, 15 of which the rollers 9 rest on support rollers 8 on the upper straightening axle journals, while the rollers 11 rest on support rollers 10. The rollers 15 carried in roller carriers 13 rest on rollers 14. The additional work rollers are used to make the machine also suitable selectively for other straightening operations. Thus, for instance, the machine illustrated in FIGURE 1 can be equipped as shown in FIGURE 2. The shearing tool can be present in accordance in the invention with both embodiments, and also with a roller straightening machine constructed in some other manner.

The machine illustrated in FIGURE 5 is provided with two supports connected together by a bridge and a base plate, and includes lower straightening rollers 71, 72, 73, 74, 75, of which the roller 71 is carried in a run-in block 68 and the roller 75 in a corresponding run-out block, as well as four upper straightening rollers 76, 77, 78, 79.

A knife arrangement is provided on each of the two supports. At the run-in side, this arrangement consists of a pair of shearing axles 61 and 62 on which rest support rollers 65. The axle 61 is equipped with circular knives 63, 64 for shearing a rolling burr 67 on both sides of a section bar 66. Both axles can be driven by electro-motors and gearing.

The rn-in block 68 carries two spring loaded rollers 69 with vertical axles, which in each case have a profile rounding in the shape of a circular concave molding 70.

In the supports on the run-out side two shearing axles 80 and 81 that can be driven are carried, together with support rollers. Circular knives 82 and 83 rest on the axles 80 and 81, respectively. These two knives are used for cutting-off the section 66.

The section forwarded to the machine from the left to the right (FIGURE 5) first runs between the axles 61, 62, and the rolling burr 67 is removed by the knives 63, 64. The section rollers 69 provided in the run-in block are so arranged that the straight shearing cut that has taken place in advance is not given the desired rounding by plastic shaping on both sides of the section 66 (see FIGURE 6).

In the directly following straightening arrangement, the straightening rollers 71, 72, 73, 74, 75 are placed against the upper rollers 76, 77, 78, 79 in such a way that the material 66 to be straightened, after passing through the roller 75, is given a straight direction. FIGURE 7 shows a section through the straightening rollers, the form of which is adapted to the cross-section of the section bar 66.

The circular knives 82, 83, lying opposite each other on the run-off side on the axles 80, 81, undertake the separating of the hinge profile 66 straightening in this way. By the arrangement of this shearing tool it is possible that the profile 66 can be divided by the shearing cut not only into two portions but a strip from the centre of the profile can be removed by two blades arranged alongside each other for achieving a determined width of the remaining profile portions.

In deviation from the embodiment illustrated in FIGURE 5, in accordance with the invention, it is also possible to arrange only a single pair of shearing axles in the machine frame or in a support placed on the run-in or run-off side.

All the characteristics mentioned in the above description and illustration in the drawing are, insofar as the known prior art allows, to be considered separately or in combination as being important for the invention, even if they are not expressly mentioned in the claims.

I claim:

1. A unitary machine for straightening material, comprising straightening axle journals arranged in staggered relationship with respect to each other in an overhung position, each axle journal having a free end, an exchangeable straightening roller accommodated on the free end of each journal, and at least one circular shearing tool means mounted on one of said journals.

2. The roller straightening machine as claimed in claim 1, in which said circular shearing tool means includes knives carried in a frame which can be pushed onto a straightening axle journal.

3. The roller straightening machine as claimed in claim 2, in which at least one knife is adjustable in the frame relative to the other knives.

4. The roller straightening machine as claimed in claim 2 in which said frame is capable of receiving traction forces.

5. The roller straightening machine as claimed in claim 1 including shearing axles arranged separately from the straightening axle journals in the frame.

6. The roller straightening machine as claimed in claim 1 in which said shearing tool means has at least two pairs of shearing axles.

7. The roller straightening machine as claimed in claim 6, in which at least one pair of shearing axles is provided for trimming the material and at least one other pair of shearing axles for separating the material.

8. The roller straightening machine as claimed in claim 7 in which at least one pair of shearing axles is arranged, in the direction of movement of the material, in front of the straightening rollers, and another pair of shearing axles is arranged behind the straightening rollers.

9. The roller straightening machine as claimed in claim 7 in which in the direction of movement of the material there are arranged behind a pair of shearing axles used for trimming, at least one calibrating or shaping rollers.

10. The roller straightening machine as claimed in claim 9, in which said calibrating or shaping rollers are each provided with a vertical axle.

11. The roller straightening machine as claimed in claim 9 in which said at least one calibrating or shaping roller is arranged in a block containing at least one run-in and run-out roller.

12. A unitary machine for straightening material, comprising frame defining means, straightening axle journals arranged in said frame defining means in staggered relationship with respect to each other in an overhung manner, each axle journal having a free and extending beyond said frame defining means, an exchangeable straightening roller accommodated on the free end of each journal, and at least one circular shearing tool mounted on said frame defining means.

13. The roller straightening machine as claimed in claim 12 further including at least one shearing tool axle mounted in said frame defining means and having a free end extending beyond said frame defining means and said at least one circular shearing tool being accommodated on the free end of said shearing tool axle.

References Cited

UNITED STATES PATENTS

| | | | |
|---|---|---|---|
| 173,858 | 2/1876 | Howells et al. | 72—162 |
| 1,005,848 | 10/1911 | Lane | 72—129 |
| 1,911,321 | 5/1933 | Long | 72—163 |
| 2,327,103 | 8/1943 | Gude | 72—160 X |
| 2,335,334 | 11/1943 | Yoder | 72—129 |
| 3,273,369 | 9/1966 | Modder | 72—164 |

MILTON S. MEHR, Primary Examiner

U.S. Cl. X.R.

72—163, 164